Nov. 20, 1923.  
U. B. FRAWLEY  
TRANSPLANTER  
Filed Sept. 3, 1921

U. B. Frawley
INVENTOR

BY Victor J. Evans
ATTORNEY

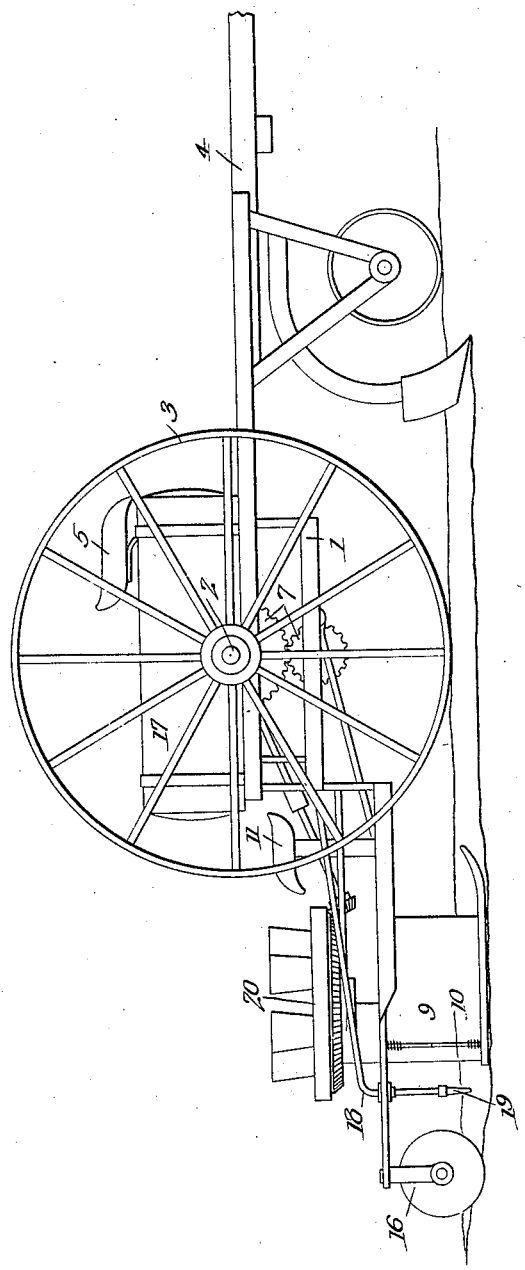

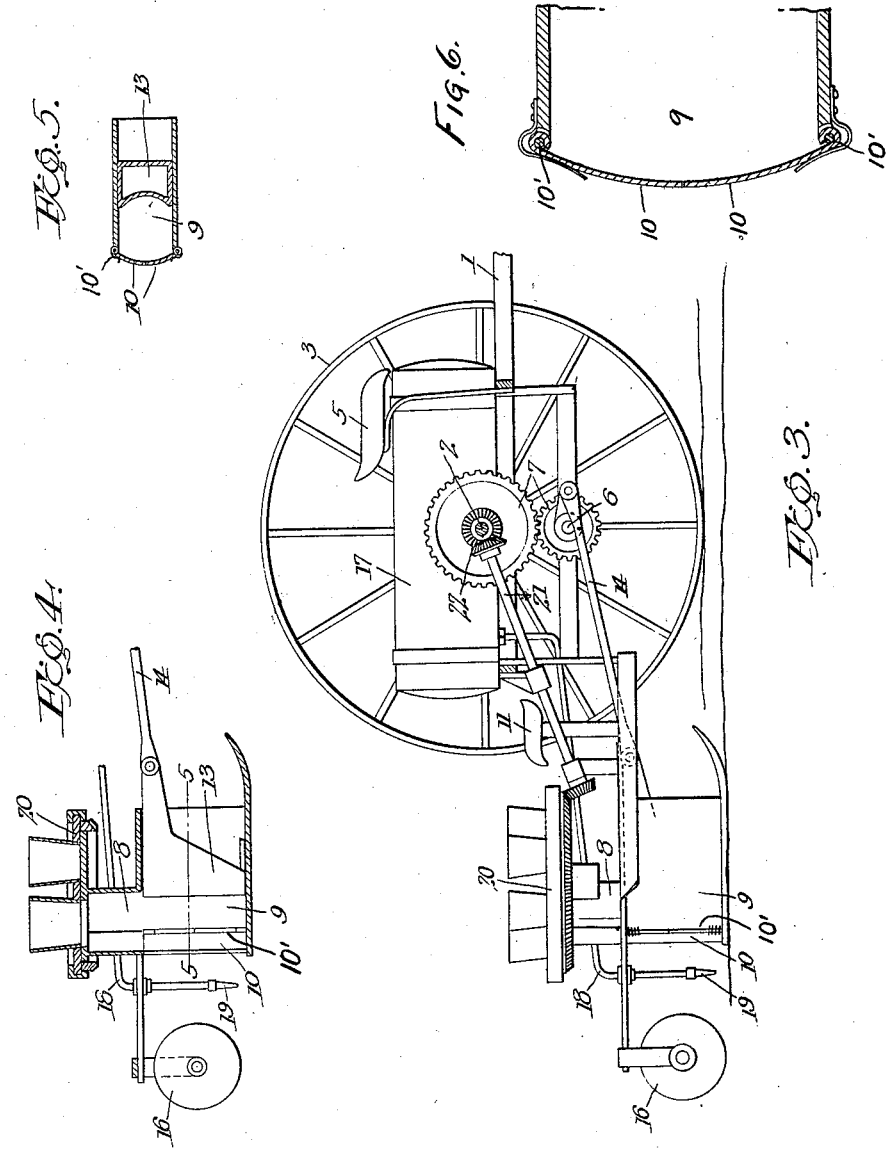

Patented Nov. 20, 1923.

1,475,061

UNITED STATES PATENT OFFICE.

ULYSSES B. FRAWLEY, OF OGEECHEE, GEORGIA.

TRANSPLANTER.

Application filed September 3, 1921. Serial No. 498,308.

*To all whom it may concern:*

Be it known that I, ULYSSES B. FRAWLEY, a citizen of the United States, residing at Ogeechee, in the county of Screven and State of Georgia, have invented new and useful Improvements in Transplanters, of which the following is a specification.

This invention relates to transplanters, the general object of the invention being to provide mechanical means for placing plants in the ground in rows at regular spaced intervals.

Another object of the invention is to provide means for supplying water to the roots of the plants in front of the covering discs.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 2 is a side view thereof.

Figure 3 is a section on line 3—3 of Figure 1.

Figure 4 is a section on line 4—4 of Figure 1.

Figure 5 is a horizontal section on line 5—5 of Figure 4.

Figure 6 is a detail view showing the arrangement of the pivoted spring influenced walls.

Figure 1:
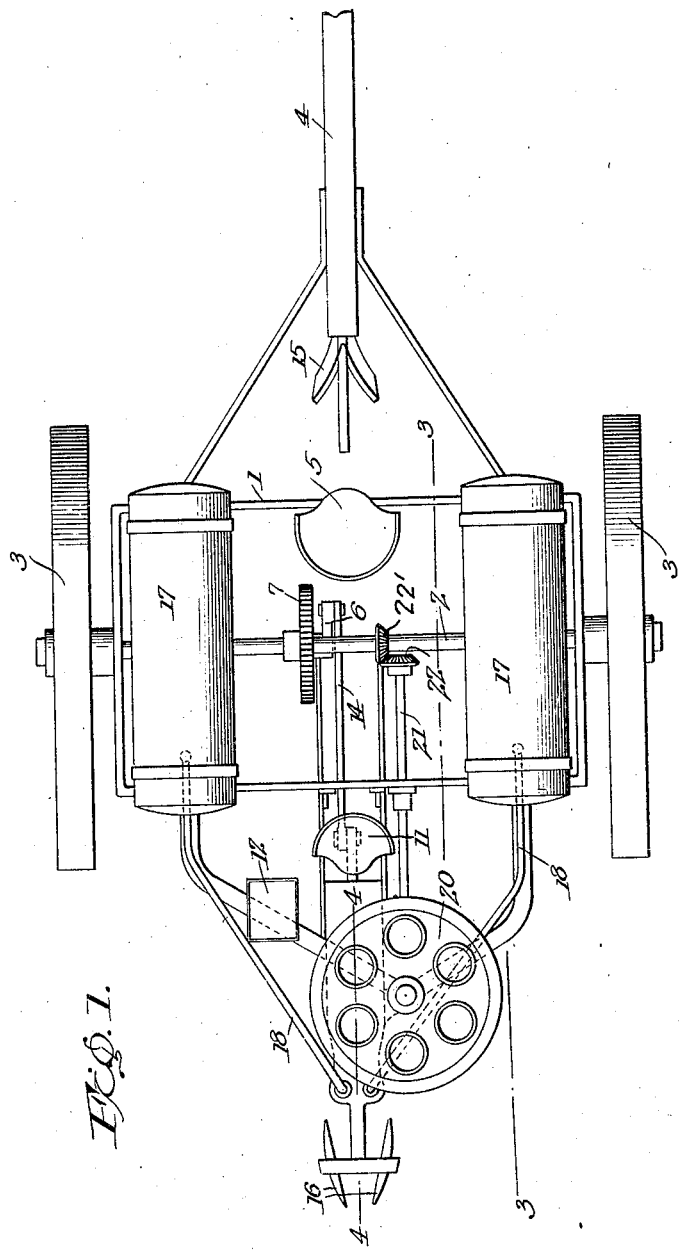
Figure 1 is a plan view of the invention.

In these views 1 indicates the frame which is supported upon the axle 2 to which the wheels 3 are connected. One of these wheels is firmly secured to the axle so that the axle will turn with the wheel. A tongue 4 is secured to the frame and a seat 5 for the driver is placed upon the frame.

It will of course be understood, however, that the frame can be so made that it can be pulled by a tractor or a single horse and in the latter case the frame may be provided with handles so that it may be guided by the operator who walks at the rear of the frame.

A crank shaft 6 is journaled in the frame and said shaft is geared to axle 2 by the gears 7. A boot 8 is supported by the frame and the lower end of said boot terminates in a housing 9, the rear of which is normally closed by spring influenced walls 10 which when pressed apart to open the housing will permit the plant to pass therefrom. The plants are fed into the boot by operators seated upon the seats 11 who take the plants from the supports 12. A plunger 13 having an arcuate face, is mounted for reciprocation within the boot and is adapted to have the side edges of its face engage and open the walls 10 on the rearward movement of said plunger and at the same time force the plant from the housing. From the construction of the plunger it is apparent that the plants will be positioned within the curved portion of the plunger so as not to be injured in engaging the spring walls 10 prior to the opening of these walls. This plunger is connected with the crank of shaft 6 by means of the pitman 14.

A plow 15 is connected with the front of the frame so as to make a furrow in which the housing of the boot travels and a pair of covering discs 16 are suitably connected with the rear part of the frame for filling the furrow after the plants are placed therein.

Tanks 17 are placed upon the frame and pipes 18 lead the water from these tanks through the nozzle 19 which is so placed that it will discharge the water into the furrow and thus water the plants before their roots are covered with dirt by the discs 16.

To insure that the plants are properly spaced when planted I may provide a rotary hopper 20 which has its bottom perforated to discharge the plants through the hopper. This hopper is rotated by means of the shafting 21 which is geared to the axle 2 through the medium of the gears 22 and 22' respectively from the axle. As will be seen the plants, one at a time, will be fed into the boot from the hopper as the perforations therein are brought over the boot. The plants are fed into the hopper by hand, from the operator's seat. By using hoppers with the perforations therein spaced different degrees apart the plants can be spaced the desired distance apart.

From the above it will be seen that the plants fed into the boot either by hand or by the hopper will pass to the housing at the bottom of the boot through the action of gravity and said plants will be forced from the housing into the furrow by the reciprocation of the plunger. This plunger forces the plant toward the spring walls 10 of the housing and then presses apart the spring walls so as to allow the plant to pass from the housing into the furrow. Water is then supplied to the roots of the plant and finally the roots are covered with dirt by the discs.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A transplanter of the class described comprising a wheeled frame, a plow arranged adjacent the front end of the frame and supported thereby, a gear carried by the axle of the wheels, a second gear designed to be rotated by the first mentioned gear and supported by a portion of the frame, a crank shaft adapted to be operated by the second gear, a boot supported by the frame and arranged adjacent the rear end thereof with its bottom portion adapted to ride in a furrow provided by the plow, a housing included in the boot having an opened front, a plunger adapted to reciprocate through the opening and within the housing, a pitman connecting the plunger with the crank shaft to impart such reciprocation thereto, spring pressed walls hingedly secured to the rear end of the housing and adapted to be opened by the plunger, and means for supplying water to the furrow and a pair of disks arranged in the rear of the boot as and for the purpose specified.

In testimony whereof I affix my signature.

ULYSSES B. FRAWLEY.